G. D. EIGHMIE.
COMBINED DRIVING AND STEERING MEANS FOR AUTOMOBILES.
APPLICATION FILED MAY 6, 1915.
1,187,514.
Patented June 20, 1916.
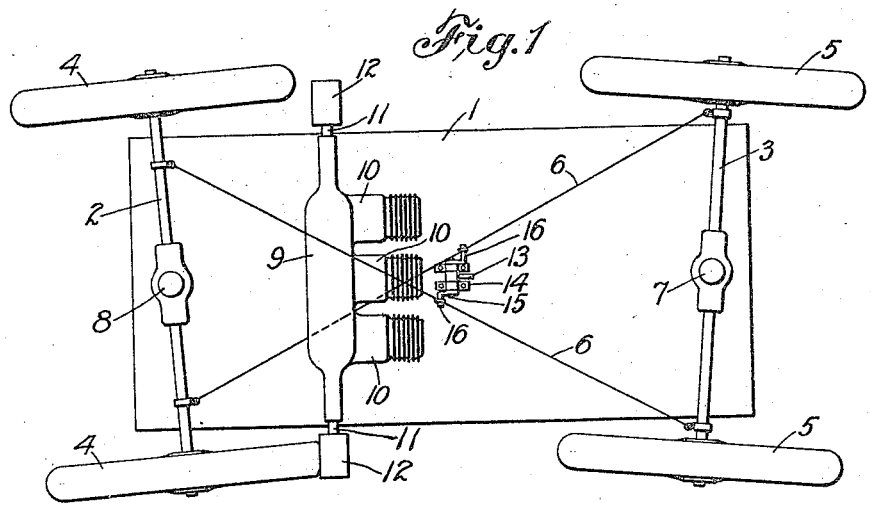
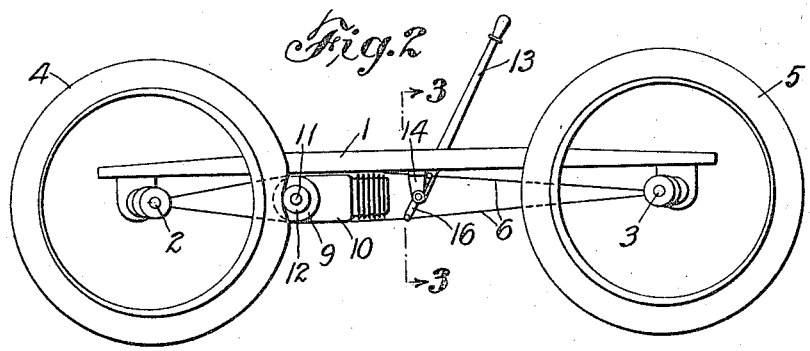
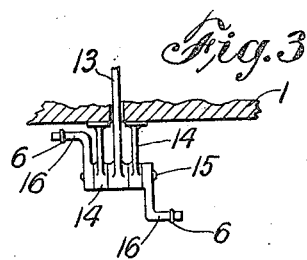
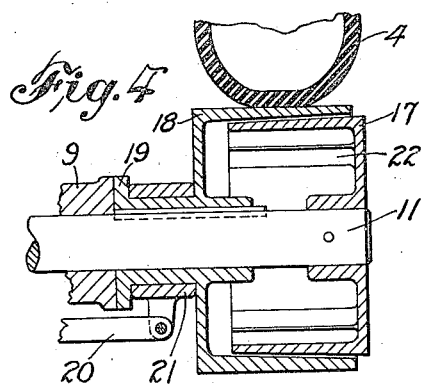
Inventor
George D. Eighmie

UNITED STATES PATENT OFFICE.

GEORGE D. EIGHMIE, OF NEW YORK, N. Y.

COMBINED DRIVING AND STEERING MEANS FOR AUTOMOBILES.

1,187,514.

Specification of Letters Patent.

Patented June 20, 1916.

Application filed May 6, 1915. Serial No. 26,310.

*To all whom it may concern:*

Be it known that I, GEORGE D. EIGHMIE, a citizen of the United States, residing at New York, in the county of New York and State of New York, have invented certain new and useful Improvements in Combined Driving and Steering Means for Automobiles, of which the following is a specification, reference being had therein to the accompanying drawing.

The invention relates to a combined driving and steering mechanism for automobiles and other vehicles.

The object is to provide a novel and extremely simple combination of mechanical parts, especially adapted for a small light weight car, runabout, or other vehicle, motor-propelled, or otherwise; and it consists essentially in an engine or motor whose drive shaft is mounted transversely of the car, and which carries friction wheels that apply their power jointly or separately to the peripheries of the driving wheels of the car, which are preferably the rear wheels, the same being arranged and associated with front and rear axles that are pivoted centrally of the length of each to the car body, and are connected by cross cables or rods having a steering function which is intimately associated with the driving operation of the friction wheels inasmuch as only a single friction wheel is performing its function in contact with a drive wheel when the vehicle is running around corners, or is running at any deviation from an entirely straight, forward, or back movement. And the invention also comprises numerous details and peculiarities in the construction, arrangement and combination of the various parts, substantially as will be hereinafter described and claimed.

In the accompanying drawing illustrating my invention: Figure 1 is a bottom plan view of my combined driving and steering mechanism for automobiles and other vehicles. Fig. 2 is a side elevation of the same. Fig. 3 is a detail view of the means for operating the steering devices. Fig. 4 is a sectional view of a modified form of clutch device for use with one of the friction wheels or pulleys that impart motion to the drive wheels.

Similar characters of reference designate corresponding parts throughout the different figures of the drawing.

The car body may obviously have any desired form or pattern. I have illustrated merely a flat platform 1, on which any convenient superstructure may be placed.

2 denotes the rear axle pivoted to the body 1 by means of the pivot 8 at the middle point of the axle, and 3 denotes the front axle pivoted at 7 to the frame 1 at the middle point of the axle. Axle 2 carries wheels 4, 4, and axle 3 carries wheels 5, 5. These axles 2 and 3 are connected together by means of the cross rods or cables 6, which are attached to the axles in any convenient way, and which cross each other at a distance apart so that there may be arranged therewith an operating device consisting of a short crank shaft 15 supported in bearings 14 attached to the underside of the frame 1, the said crank shaft 15 having crank arms 16, one of which is attached to one of the cables 6, and the other to the other cable. An operating lever 13 which passes up through the frame 1 is secured to the shaft 15, and is susceptible of easy manipulation so that when it is moved in one direction, the crank arms 16, which are attached to the cables 6, will move said cables and consequently turn the axles so as to steer the car in one direction, and when the lever 13 is moved in the opposite direction, the crank arms 16 will move the cables 6 and cause the car to be steered in another direction.

Supported by the main frame 1, either above or below, is the motor or gas engine or other propelling means 9, which, in this instance, is shown to consist of three cylinders 10. The shaft 11 of this motor lies transversely across the machine, and is provided at its opposite ends with friction rollers, pulleys, or wheels 12, which are adapted to come easily into contact with the peripheries of the drive wheels 4, and as such peripheries are usually shod with pneumatic tires, the frictional pressure will be found to be effective, and enabling the friction wheels 12 to effectively impart rotary motion to the wheels 4, and thus drive the car. Obviously the motor and its shaft and the friction driving pulleys or wheels may partake of a great variety of different forms, and I do not wish to be restricted to any precise structure thereof, but reserve the liberty of employing such specimens of these parts as may do the work in the best way.

It will be obvious that the friction drive and the cross cable steering appliance are intimately associated for the production of a mutually beneficial result inasmuch as it will be perceived that in steering in one direction or the other, the shaft 2, whose wheels 4 are actuated by the friction wheels 12, will, whenever the car is caused to depart from a straight, forward, or back motion, release one of the wheels from its companion friction wheel, and cause the other of said drive wheels to be pressed more firmly upon its companion friction drive wheel. Thus it will be seen by moving the lever 13 backward or forward, one or the other of the drive wheels 4 will be brought into closer frictional contact with its friction drive pulley, and thus at the time when it is necessary in turning curves and the like to have the driving action more powerful than at other times. Such increase of pressure of the wheel against the friction driving pulley will be possible in view of the pneumatic character of the tire, and will not be enough to interfere with the proper action or operation of said tire, or the wheel which carries it, and it will be found in practice that the release of one of the drive wheels from its friction drive pulley, and the closer application of the other to its friction drive pulley, will not interfere with the regular and even running of the machine, but will be conducive to a more effectual and economical operation, especially in the use of light and simple automobiles, the construction of which my present invention is designed to stimulate and foster.

In view 4 I have delineated a modification of the invention where the drive shaft 11 is shown as provided with a friction wheel 17, surrounding which is another friction wheel 18 whose hub 19 is designed to slide loosely on the shaft 11 and to be brought at times with a braking action against the side of the engine 9. The members 18 and 17 have conical faces in contact with each other, so as together they constitute a cone clutch, which is operated by the sliding of the outer wheel 18 back and forth over the wheel 17, said outer wheel 18 being in contact with the pneumatic tire of the adjoining drive wheel. A lever 20 arranged conveniently in connection with the main frame and operating a fork 21 which embraces the hub 19 of the outer member 18 of the cone clutch, is utilized to throw the clutch into and out of action. The inner friction member of this clutching device 17 is rigidly attached to the shaft 11 and may, if desired, carry fan blades 22 to create a current of air.

Having thus described my invention, what I claim as new and desire to secure by Letters Patent, is:

1. A driving mechanism for automobiles and the like, comprising a body, an engine carried thereby and having its drive-shaft transverse to the body, friction wheels on the opposite ends of said shaft, and drive-wheels for the automobile, the latter having pneumatic or cushion tires to the tread of which the friction wheels jointly or severally apply their power, and a centrally-pivoted axle for said wheels and means for swinging the same on its pivot to disengage one or the other of the friction wheels from the adjacent drive wheel.

2. The combination of a car body and its drive-wheels, an engine carried thereby having a transverse shaft, friction wheels thereon which apply their power to the drive wheels, a centrally-pivoted axle for said drive-wheels, a second axle also centrally-pivoted, and cross rods connecting said axles, and means for actuating said rods in either direction so as to swing the centrally-pivoted axle of the drive wheels on its pivot to disengage one or the other of the friction wheels from the adjacent drive wheel.

3. The combination of a car frame, a rear axle pivoted at its middle point thereto, wheels on said axle, a front axle also pivoted at its middle point to the car frame, wheels on said front axle, rods or cables connecting the opposite ends of the axles together and crossing each other, and a friction-driving device operating against the tread of the tires of the rear wheel, and means for actuating the aforesaid cables in either direction so as to swing the rear axle on its pivot so as to disengage one or the other of the rear wheels from the adjacent friction driving device.

4. A combined driving and steering means for automobiles and the like, comprising a car frame, drive wheels for the car, a centrally-pivoted axle for said drive wheels, a motor on the frame whose shaft is transverse to the car, friction wheels on said shaft, which wheels apply their power to the drive wheels, and steering devices controlling the direction of the travel of the car and also the action of the friction wheels on one side or the other.

5. In a device of the class described, a car and its drive wheels, friction wheels engaging said drive wheels on both sides of the car when the latter moves straight forward or backward, and on one side only where there is any deviation from said forward and backward movement. a motor for said friction wheels, and means for guiding the direction of movement of the car.

In testimony whereof I affix my signature.

GEORGE D. EIGHMIE.